US006809750B2

(12) United States Patent
Ishiguro et al.

(10) Patent No.: US 6,809,750 B2
(45) Date of Patent: Oct. 26, 2004

(54) IMAGE FORMING APPARATUS AND IMAGE FORMING METHOD (75) Inventors: Kazuhiro Ishiguro, Toyohashi (JP); Yoshihiko Hirota, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/646,701

(22) Filed: Aug. 25, 2003

(65) Prior Publication Data
US 2004/0037585 A1 Feb. 26, 2004

(30) Foreign Application Priority Data
Aug. 26, 2002 (JP) ........................................ 2002-245034

(51) Int. Cl.$^7$ ................................................ B41J 2/385
(52) U.S. Cl. ..................... 347/116; 347/117; 347/249; 356/701; 101/486
(58) Field of Search ................................ 347/116, 117, 347/232, 250, 249; 356/401; 358/448; 101/485, 486

(56) References Cited

U.S. PATENT DOCUMENTS

| | | | | |
|---|---|---|---|---|
| 4,916,547 A | * | 4/1990 | Katsumata et al. | ......... 358/300 |
| 5,276,533 A | * | 1/1994 | Shimizu et al. | ............. 358/448 |
| 5,610,651 A | * | 3/1997 | Yamakawa et al. | ......... 347/250 |
| 5,933,184 A | * | 8/1999 | Ishigami et al. | ............ 347/256 |
| 6,236,418 B1 | * | 5/2001 | Yamakawa | ................... 347/129 |
| 6,310,681 B1 | | 10/2001 | Taniwaki | |
| 6,424,432 B1 | * | 7/2002 | Koide et al. | ................. 358/1.9 |
| 6,473,204 B1 | * | 10/2002 | Suzuki et al. | ............... 358/448 |
| 6,614,506 B2 | * | 9/2003 | Kodama et al. | .............. 355/32 |
| 2001/0028387 A1 | * | 10/2001 | Maeda | ........................ 347/232 |

FOREIGN PATENT DOCUMENTS

JP          11-198435          7/1999

* cited by examiner

Primary Examiner—Eugene H. Eickholt
(74) Attorney, Agent, or Firm—Burns, Doane, Swecker & Mathis, L.L.P.

(57) ABSTRACT

It is intended to provide an image forming apparatus and image forming method capable of partial magnification corrections on various partial variations of magnification as well as constant and uniform positional shift regardless of any sections. A modulated image clock of a reference color (black) is generated from a clock generated at an image clock generating section 23 and an address is generated at an address generating circuit 36 basing on the modulated image clock. Output sections 30 for respective colors other than the reference color read out correction coefficients from correction coefficient memories 15 of respective colors following the address generated. Frequency modulator circuits 31 modulate image clocks in accordance with correction coefficients. PWM 33 outputs a driving pulse to a laser driver 6 basing on modulated image clocks synchronized with a reference signal 40 by synchronizer circuits 32 and inputted image data.

15 Claims, 7 Drawing Sheets

IMAGE FORMING APPARATUS AND IMAGE FORMING METHOD

This application is based upon and claims the benefit of priority from Japanese Patent Application No. 2002-245034 filed on Aug. 26, 2002, the entire contents of which are incorporated herein by reference.

BACKGROUND OF THE INVENTION

1. Field of the Invention

The present invention relates to an image forming apparatus and image forming method for forming an image with tandem-type multi coloring machine. More particularly, it relates to an image forming apparatus and image forming method for correcting sectional and positional shifts of respective color images to be united in one color image.

2. Description of Related Art

A tandem-type color image forming apparatus has a plurality of image carriers and as the result of it, there may occur positional shifts of respective color images. For example, shape and attachment error of optical parts, attachment error of image carriers, a warp of the entirety of the apparatus due to environmental change such as temperature change or the like cause positional shifts of respective colored toner images formed on a transfer belt. Therefore, there has conventionally been practiced a method such that positional shifts of respective color images are detected using registered patterns to correct the positional shifts. That is, registered patterns of predetermined forms are formed on the transfer belt for respective colors and positions of respective color images on the transfer belt are detected by an optical sensor or the like. Various corrections are taken basing on the detection result to reduce positional shifts of respective colored toner images.

Partial magnification variations, other than errors of entire magnification and shifts of start points of image formation, can be components of positional shifts in main scanning direction. Correction of such partial magnification variations is so-called a partial magnification correction. Conventionally, a partial magnification correction has been carried out by modulating video clock of a light source, thereby to change sizes of respective dots. For example, Japanese laid-open patent publication No. 11-198435 discloses a method of partial magnification correction indicated as follows. That is, main scanning directional magnification variations are detected to calculate how much change is needed for frequency of an output image clock within one line of scanning. Frequency of an output image clock is changed by a constant rate of change width so that the frequency is changed by a calculated value within one line of scanning.

However, the above-mentioned conventional method of partial magnification correction in main scanning direction can cope with only constant and uniform positional shifts regardless of any portions. For example, this method cannot cope with a case such that a left edge and a right edge are extended and center portion is shrunk.

SUMMARY OF THE INVENTION

The present invention has been made to solve the above described problems of conventional image formation technology. That is, it is an object of the present invention to provide an image forming apparatus and image forming method capable of partial magnification corrections on various partial variations of magnification as well as constant and uniform positional shift regardless of any sections.

To achieve the object, according to a first aspect of the present invention, there is provided an image forming apparatus being tandem type and forming an image by superimposing images formed at image forming sections of respective colors, the image forming apparatus comprising: a correction memory which stores main scanning directional magnification correction data of respective colors with reference to a reference color; a reference magnification memory which stores main scanning directional magnification of the reference color; an image clock generating section which generates an image clock; a readout unit which reads out main scanning directional magnification correction data of respective colors from the correction memory basing on a reference magnification clock which is equivalent to an image clock modulated basing on main scanning directional magnification of the reference color; a modulated clock generating section which generates modulation clocks for respective colors by modulating an image clock basing on main scanning directional magnification correction data of respective colors read out by the readout unit; and an image formation controlling section which generates control signals to the image forming sections in accordance with modulated clocks of respective colors generated by the modulated clock generating section and image data of respective colors, wherein respective image forming sections conduct image formation in accordance with control signals of respective colors from the image formation control section.

According to a second aspect of the present invention, there is provided an image forming apparatus being tandem type and forming an image by superimposing images formed at image forming sections of respective colors, the image forming apparatus comprising: a correction memory which stores main scanning directional magnification correction data of respective colors with reference to an imaginary color; a reference magnification memory which stores main scanning directional magnification; an image clock generating section which generates an image clock; a readout unit which reads out main scanning directional magnification correction data of respective colors from the correction memory basing on a reference magnification clock which is equivalent to an image clock modulated basing on main scanning directional magnification; a modulated clock generating section which generates modulation clocks for respective colors by modulating an image clock basing on main scanning directional magnification correction data of respective colors read out by the readout unit; and an image formation controlling section which generates control signals to the image forming sections in accordance with modulated clocks of respective colors generated by the modulated clock generating section and image data of respective colors, wherein respective image forming sections conduct image formation in accordance with control signals of respective colors from the image formation control section.

According to a third aspect of the present invention, there is provided image forming method for forming an image by superimposing images formed at image forming sections of respective colors, the image forming method comprising steps of: obtaining main scanning directional magnification of a reference color; obtaining main scanning directional magnification correction data of respective colors with reference to the reference color; reading out main scanning directional magnification correction data of respective colors other than the reference color basing on a reference magnification clock which is equivalent to an image clock modulated by main scanning directional magnification of the reference color; generating modulated clocks of respective colors by modulating an image clock basing on main scanning directional magnification correction data of respective colors read out; generating control signals of respective colors in accordance with modulated clocks of respective colors and image data of respective colors; and forming images of respective colors in accordance with the control signals of respective colors.

According to a fourth aspect of the present invention, there is provided an image forming apparatus being tandem type and forming an image by superimposing images formed at image forming sections of respective colors, the image forming apparatus comprising: a memory which stores image data of respective colors for image formation by each main scanning directional line; an image processing section which conducts image processing in accordance with an input-side clock upon receipt of inputs of image data of respective colors and writing image data after through the image processing in the memory in accordance with an input-side clock; an input-side clock supplying section which supplies an input-side clock to the image processing section and the memory; an image clock generator which generates an image clock; a modulated clock generator which generates modulated clocks of respective colors by modulating image clocks in accordance with main scanning directional magnification correction data of respective colors; and an image formation control section which generates control signals to respective image forming sections by reading out image data of respective colors from the memory in accordance with modulated clocks of respective colors generated at the modulated clock generator, wherein respective image forming sections form images of respective colors in accordance with control signals of respective colors from the image formation control section.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

For a better understanding of the present invention, reference is made to the following detailed description of the invention, just in conjunction with the accompanying drawings in which.

DETAILED DESCRIPTION OF THE PREFERRED EMBODIMENTS

A preferred embodiment of the present invention will be described in detail below by referring to drawings. The present embodiment is an application of the present invention and there is embodied a tandem-type color image forming apparatus, consists of four colors: cyan (C); magenta (M); yellow (Y); and black (K).

Figure 1:
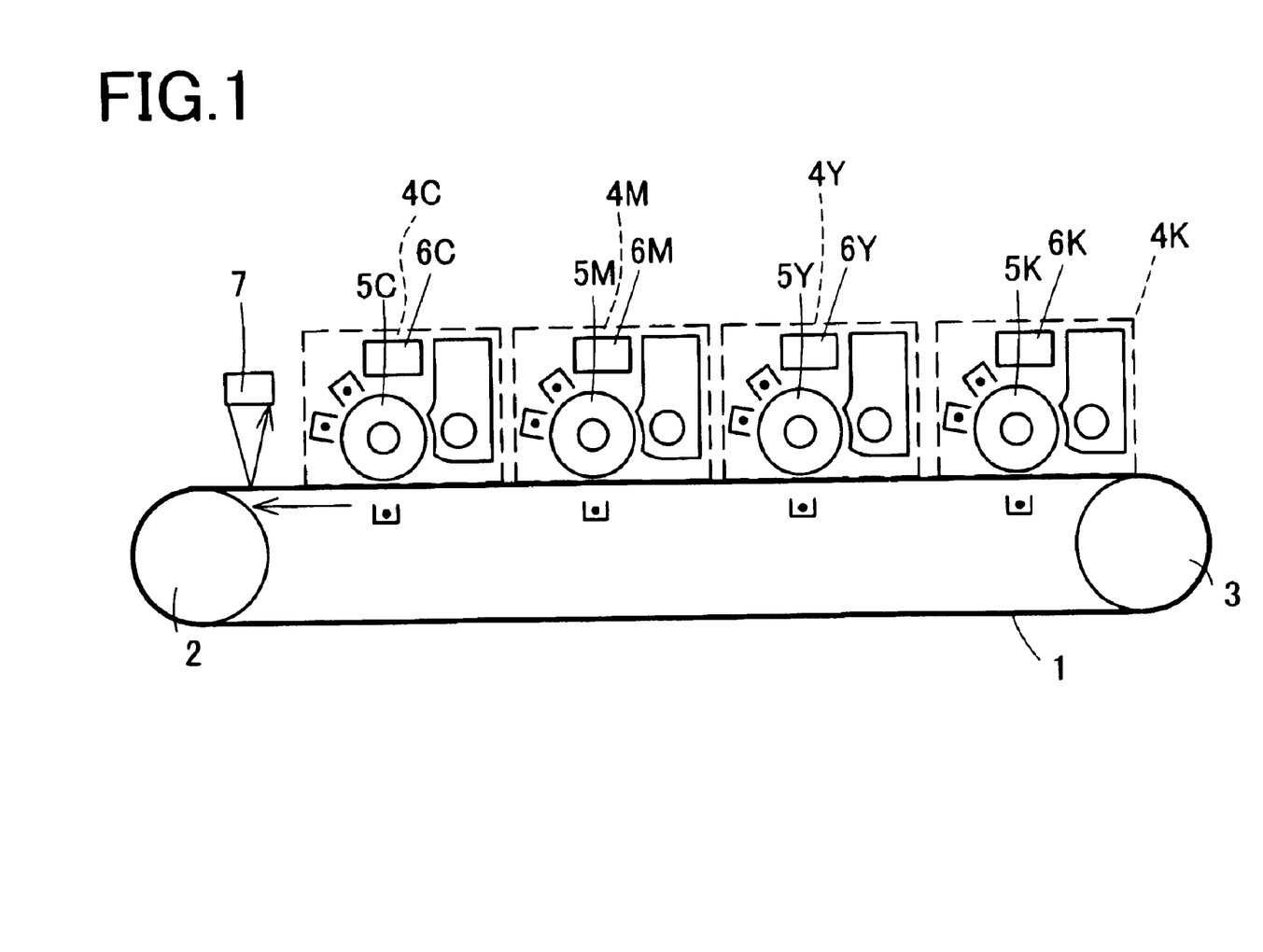
FIG. 1 is a schematic diagram of an image forming apparatus directed to the present embodiment.

An image forming apparatus directed to this embodiment is structured as shown in FIG. 1. A transfer belt 1 is held rotatably by rollers 2 and 3. Image forming sections of respective colors 4C, 4M, 4Y, and 4K are arranged along with the transfer belt 1. The image forming sections 4C, 4M, 4Y, and 4K include image carriers 5C, 5M, 5Y, and 5K, and laser drivers 6C, 6M, 6Y, and 6K for exposure, respectively. When an image is formed with this image forming apparatus, the image carriers 5C, 5M, 5Y, and 5K are exposed by the laser drivers 6C, 6M, 6Y, and 6K, respectively, thereby to form electrostatic latent images of respective colors. Next, those electrostatic latent images are developed and toner images of respective colors are formed. Furthermore, those toner images of respective colors are superimposed on the transfer belt 1 to form a color image and the resultant color image is transferred onto paper.

Figure 2:
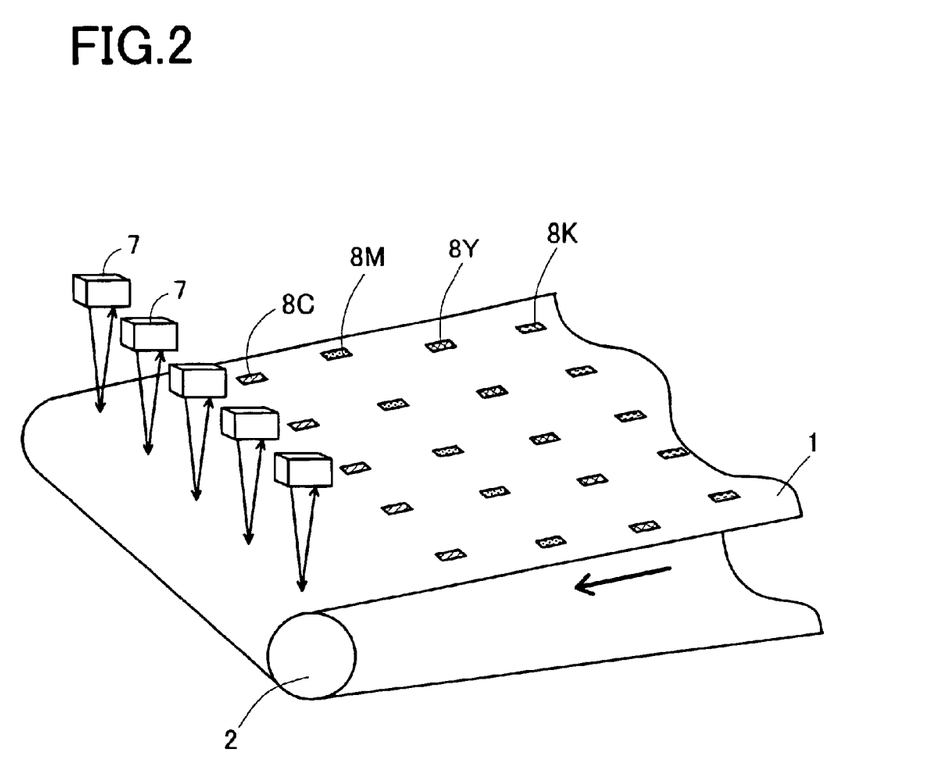
FIG. 2 is a schematic diagram for illustrating detection of registered marks.

In such an image forming apparatus, there are provided the image carriers 5C, 5M, 5Y, and 5K for respective color. Therefore, positional shifts of respective colors are likely to occur due to various causes. So, for correcting a positional shift, degree of the positional shift is detected firstly. Therefore, as shown in FIG. 1 and FIG. 2, there are provided a plurality of registered mark detecting sensors 7 at the down stream side of the respective image forming sections 4C, 4M, 4Y, and 4K along with a width direction (i.e. main scanning direction) of the transfer belt 1. These registered mark detecting sensor 7 are optical sensors and provided for detecting toner images of registered marks 8C, 8M, 8Y, 8K and the like formed on the transfer belt 1.

Figure 3:
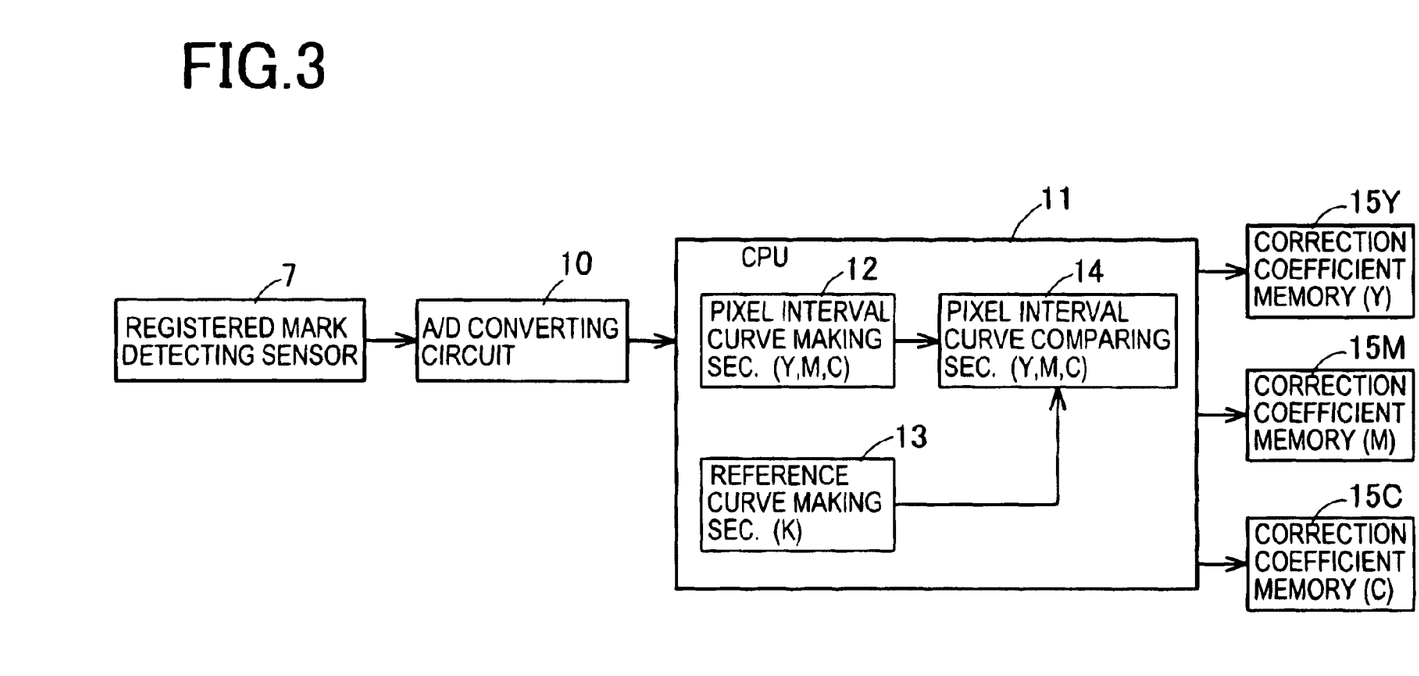
FIG. 3 is a block diagram showing schematic structure for calculating a correction coefficient.

Furthermore, as shown in FIG. 3, this image forming apparatus includes structure for calculating correction coefficients of respective colors from positions of detected registered marks 8C, 8M, 8Y, and 8K. That is, the structure is constituted by an A/D converting circuit 10, a CPU 11, and correction coefficient memories 15Y, 15M, 15C for respective colors as well as the registered mark detecting section 7. In this embodiment, it is arranged such that black (K) is a reference color and other three colors are to be met with the position of black-colored image. Therefore, correction coefficient memories are provided for three colors other than black. Furthermore, the CPU 11 includes a pixel interval curve making section 12 for making pixel interval curves of the three colors (Y, M, and C), a reference curve making section 13 for making a pixel interval curve of black and a pixel interval curve comparing section 14 for comparing pixel interval curves of the three colors with a reference curve.

Manners of registered mark detection and correction coefficient calculation will be described. Those processing are preparatory processing and appropriately executed during time other than of image formation, e.g. time of starting-up of the image forming apparatus. Firstly, as shown in FIG. 2, the image forming sections 4C, 4M, 4Y, and 4K form registered marks on the transfer belt 1. The registered marks are stored as patterns previously determined and the respective image forming sections 4C, 4M, 4Y, and 4K form toner images on the transfer belt 1 basing on the stored data. Registered marks of respective colors are made and arranged in a main scanning direction by a plural number corresponding to the number of the registered mark detecting sensor 7. Registered marks of respective colors formed there are sent to the position of the registered mark detecting sensor 7 in order along a rotation of the transfer belt 1 and detected by the registered mark detecting sensor 7. After that, registered marks formed on the transfer belt 1 are cleaned out without being transferred onto paper.

A detection signal from the registered mark detecting sensor 7 is inputted to the A/D converting circuit 10 to be converted into a digital signal. The digital signal is inputted to the CPU 11. The CPU 11 makes up a pixel interval curve from the inputted digital signal. The pixel interval curve making section 12 makes up pixel interval curves (Y, M, and C) from data of three colors other than black. From black data, the reference curve making section 13 makes up a reference curve 17, i.e., a pixel interval curve of black.

Figure 4:
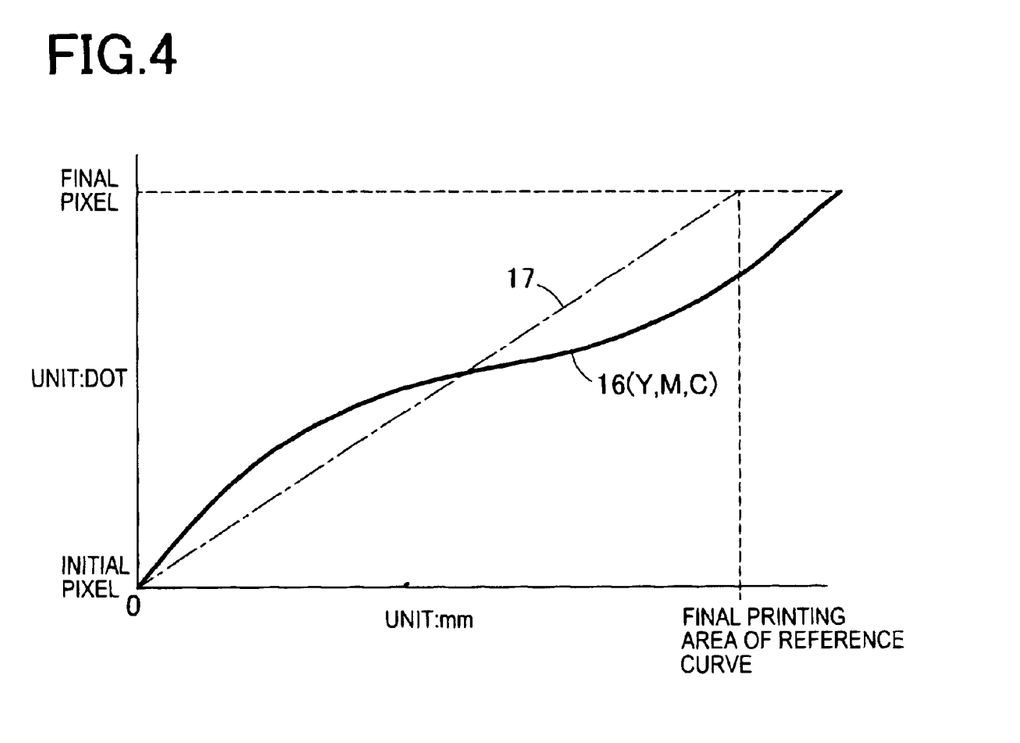
FIG. 4 is a graph showing an example of a pixel interval curve.

As illustrated in FIG. 4, the pixel interval curves 16 show relation of main scanning directional print positions and pixel numbers for respective colors. Thereby, extension and shrinkage between respective positions are expressed. The pixel interval curve making section 12 and the reference curve making section 13 make up these pixel interval curves 16 and the reference curve 17 by complementing intervals basing on detection results obtained by the plurality of detection sensors 7. The reference curve 17 is expressed with a straight line in FIG. 4, however, it is not always a straight line.

Next, in the CPU 11, the pixel interval curve comparing section 14 compares respective pixel interval curves 16 (Y, M, and C) with reference curve 17. The entirety of main scanning direction is divided into plural regions wherein the pixel interval curve comparing section 14 compares degree of extension/shrinkage between pixels of each color at each divided region with reference curve 17. Then, correction coefficients for making extension/shrinkage of respective region meet with the reference curve 17 are calculated. After that, calculated correction coefficients and corresponding addresses are stored in the correction coefficient memories 15Y, 15M, and 15C.

Next, structure of the image forming apparatus, especially for image formation structure, will be described by referring to FIG. 5 and FIG. 6. Those drawings show portions for forming image with main scanning directional partial magnification correction being applied depending on inputted image data. This image formation is conducted on condition that the above mentioned preparatory processing has completed and correction coefficients of respective colors has been stored with corresponding addresses in the correction coefficient memories 15Y, 15M, and 15C. This image processing is executed by a user's instruction in general.

Figure 5:
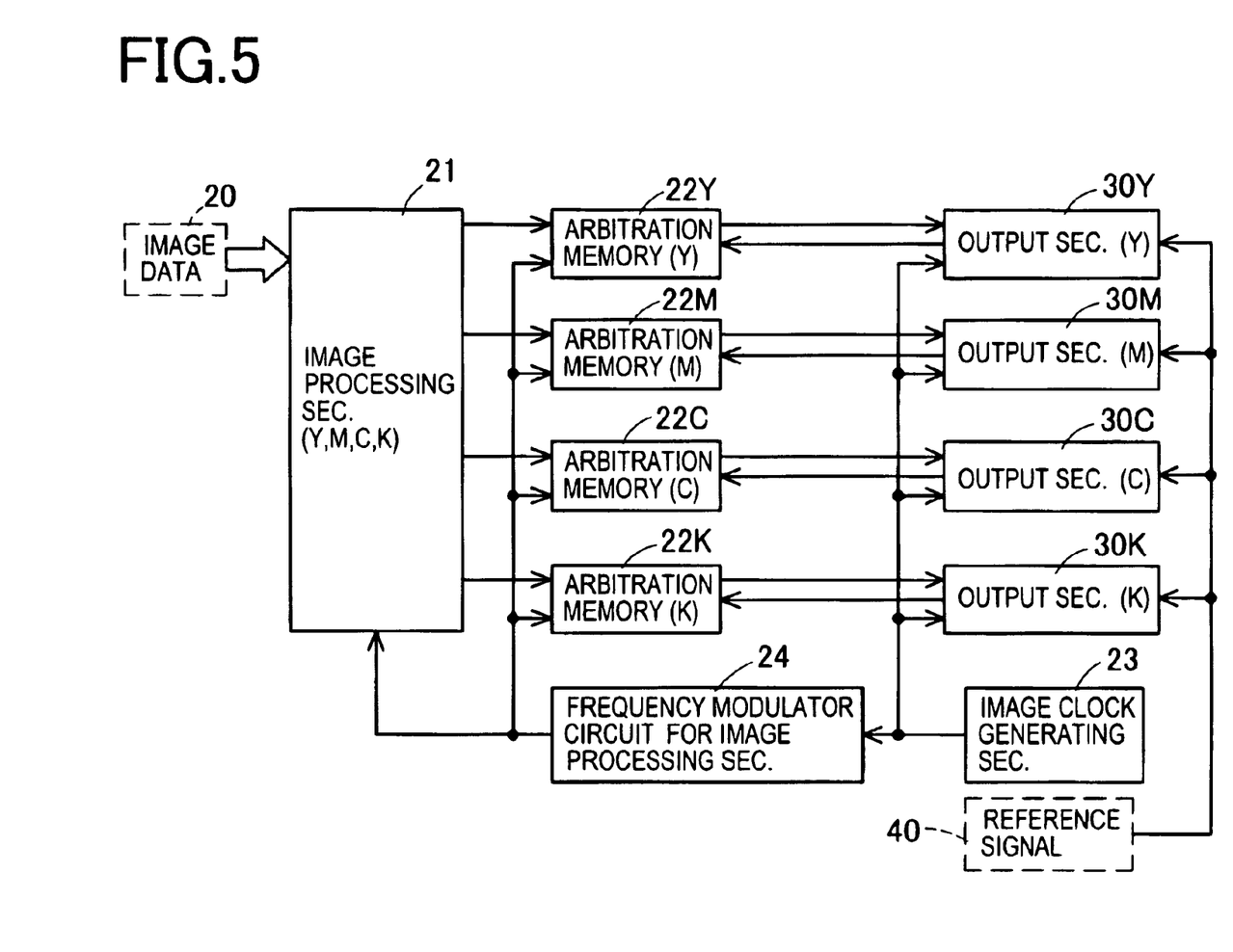
FIG. 5 is a block diagram for illustrating schematic structure for partial magnification correction in a main scanning direction.

As shown in FIG. 5, this image forming apparatus comprises: an image processing section 21 for making input data of four colors (Y, M, C, and K) upon receiving an input of image data 20; output sections 30Y, 30M, 30C, and 30K for driving respective image forming sections 4Y, 4M, 4C, and 4K upon receiving inputs of input data; and arbitration memories 22Y, 22M, 22C, and 22K for arbitrating speed difference between the image processing section 21 and each of the output sections 30Y, 30M, 30C, and 30K. The arbitration memories 22Y, 22M, 22C, and 22K are FIFO-type memories. Furthermore, the image forming apparatus further comprises: an image clock generating section 23 for generating a clock to operate the entirety of image formation system; and a frequency modulator circuit for image processing 24 for modulating frequency of a clock generated at the image clock generating section 23 to make it suitable for the image processing section 21.

Figure 6:
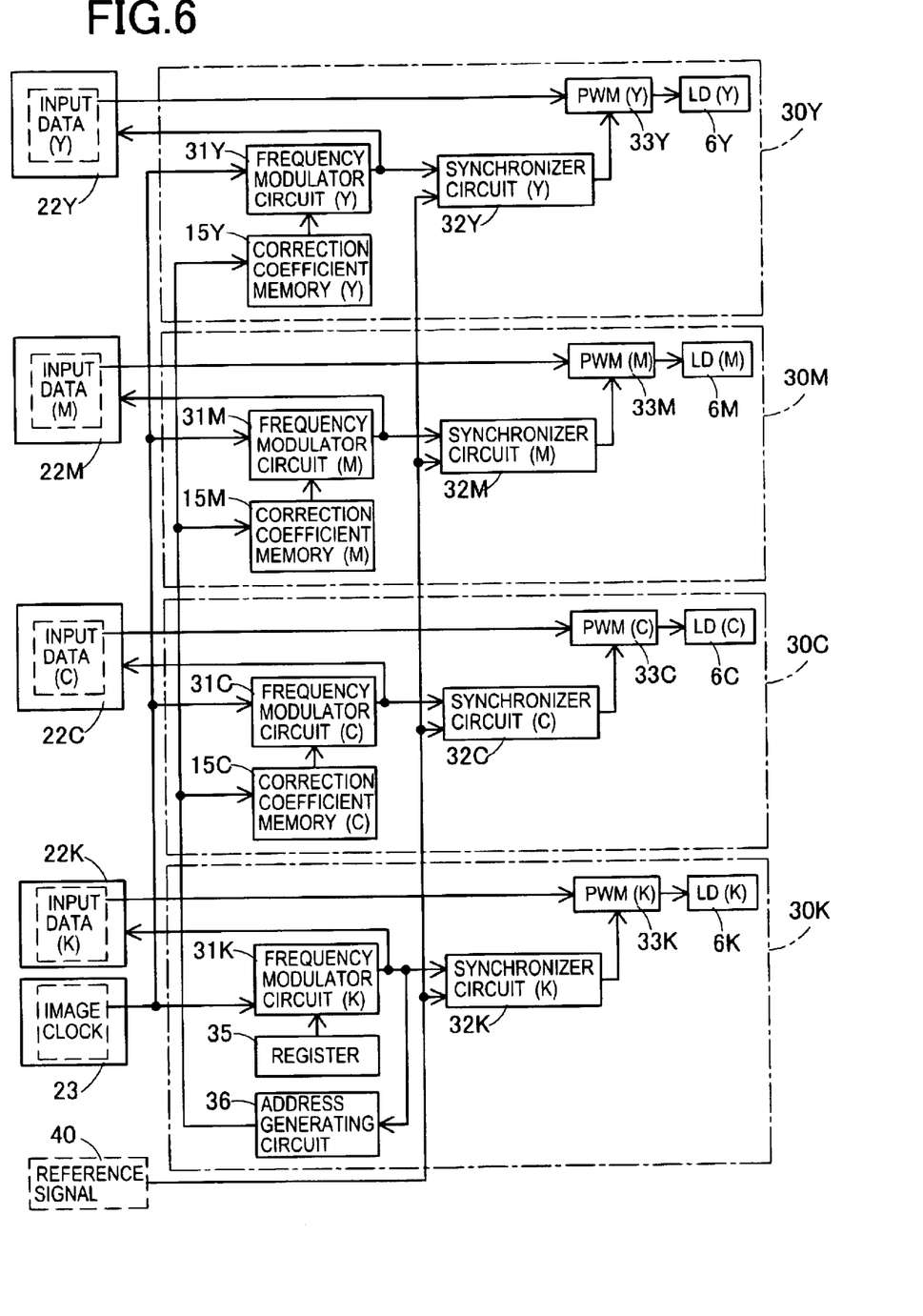
FIG. 6 is a block diagram for illustrating schematic structure for partial magnification correction in a main scanning direction.

As shown in FIG. 5 and FIG. 6, the output sections 30Y, 30M, 30C, and 30K make laser drivers 6Y, 6M, 6C, and 6K of respective color in the image forming section drive basing on input image data (Y, M, C, and K), (see FIG. 1) and output images of respective colors. Respective output sections 30Y, 30M, 30C, and 30K are structured as shown in FIG. 6. The output section 30Y includes a correction coefficient memory 15Y (see FIG. 3), a frequency modulating circuit for output 31Y, synchronizer circuit 32Y, PWM (pulse width modulator circuit) 33Y, and a laser driver 6Y. Output sections 30M and 30C of other two colors except for black are structured the same as the output section 30Y.

On the other hand, the output section 30K for black includes a register 35 and an address generating circuit 36 instead of a correction coefficient memory. Since black is a reference color, data of it is outputted without partial magnification correction. Therefore, the output section 30K does not need a correction coefficient memory. However, main scanning directional magnification correction for correcting magnification on entirety of main scanning direction is conducted for black. Therefore, a setting value is stored in the register 35. This setting value as well as contents of the correction coefficient memories 15Y, 15M, and 15C is calculated at the CPU 11 by using a detection value obtained at the registered mark detecting sensor 7 in preparatory processing and written in the register 35.

Next, there will be described operation of this image forming apparatus. More particularly, there will be described image forming method for forming an image by superimposing images formed at image forming sections of respective colors, the image forming method comprising: a step to obtain main scanning directional magnification of a reference color; a step to obtain main scanning directional magnification correction data of respective colors with reference to the reference color; a step to read out main scanning directional magnification correction data of respective colors other than the reference color basing on a reference magnification clock that is equivalent to an image clock modulated by main scanning directional magnification of the reference color; a step to generate modulated clocks of respective colors by modulating an image clock basing on main scanning directional magnification correction data of respective colors read out; a step to generate control signals of respective colors in accordance with modulated clocks of respective colors and image data of respective colors; and a step to form images of respective colors in accordance with the control signals of respective colors.

Firstly, operation around the image processing section 21 shown in FIG. 5 will be described. In this image forming apparatus, a basic image clock is generated at the image clock generating section 23 and the image clock is modulated and used for other sections. Image data 20 of respective colors are inputted to the image processing section 21 and screen processing and error diffusion processing and the like are applied on the image data 20 whereby, input color data of respective colors are generated for each line. Since operation clock should be constant for this image processing section 21, a clock generated by modulation at the frequency modulator circuit for image processing 24 is used for image processing section 21. Furthermore, clocks equivalent to that for image processing section 21 are inputted to arbitration memories of respective colors 22Y, 22M, 22C, and 22K. In synchronous with those clocks, input image data of respective colors per line are written in the arbitration memories 22Y, 22M, 22C, and 22K.

Next, operation of an output section for black 30K will be described by referring to FIG. 6. An image clock generated at the image clock generating section 23 is inputted to a frequency modulator circuit 31K. The frequency modulator circuit 31K modulates frequency of an image clock to a predetermined multiple using a value stored in a register 35 for main scanning directional magnification correction. This modulated image clock (K) is inputted to an arbitration memory 22K, a synchronizer circuit 32K, and an address generating circuit 36. The arbitration memory 22K outputs one line of input data (K) in synchronous with the modulated image clock (K). The synchronizer circuit 32K inputs a PWM driving clock (K) equivalent to a modulated image clock (K) synchronized with a reference signal 40 to a PWM 33K. A reference signal 40 is an SOS signal that indicates start of scanning at an output section 30K and PWM driving clocks of respective colors are synchronized with the reference signal 40. Receiving inputs of a PWM driving clock (K) and an inputted data (K) read out from the arbitration memory 22K, the PWM 33K generates a pulse for driving a laser driver 6K.

Furthermore, the address generating section 36 generates an address from an inputted modulated image clock (K). This address corresponds to a position of each of plurality sections into which the pixel interval comparing section 14 has divided the entirety of main scanning direction. Timing to generate an address is in synchronous with a modulated image clock (K). Addresses that the address generating circuit 36 generates are inputted to the correction coefficient memories 15Y, 15M, and 15C so that respectively corresponding correction coefficients are read out.

Next, operation of an output section 30Y for yellow will be described. Output sections 30M and 30C for other two colors operate in the same manner as the output section 30Y. An image clock generated at the image clock generating section 23 is inputted to the frequency modulator circuit 31Y. Furthermore, an address generated at the address generating section 36 is inputted to the correction coefficient memory 15Y. The correction coefficient 15Y outputs a correction coefficient corresponding to the inputted address to the frequency modulator circuit 31Y. The frequency modulator circuit 31Y applies modulation on frequency of an image clock in accordance with the correction coefficient inputted from the correction coefficient memory 15Y. Thereby, a modulated image clock (Y) is generated. Frequency of this modulated image clock (Y) is corrected by each address and partially varied.

This modulated image clock (Y) is inputted to the arbitrator circuit 22Y and the synchronizer circuit 32Y. Thereby, the arbitrator memory 22Y outputs one line of input data (Y) in synchronous with this modulated image clock (Y). The synchronizer circuit 32Y inputs a PWM driving clock (Y) that is equivalent to the modulated image clock (Y) synchronized with a reference clock 40 to the PWM 33Y. Receiving inputs of a PWM driving clock (Y) and input data read out from the arbitrator memory 22Y, the PWM 33Y generates a pulse for driving a laser driver 6Y.

Here, timing to generate addresses for reading out respective correction coefficients from the correction coefficient memories 15Y, 15M, and 15C is generated from a modulated image clock (K) for black. Thereby, timings to switch frequencies of respective colors coincide with one another and lengths of one line of respective colors become equivalent. It should be noted that in case this clock for black is not used for a reference of generating an address, an oscillator or the like is required to generate and output a reference clock for generating an address. Furthermore, it is not preferable that output clocks of the frequency modulator circuits 31Y, 31M, and 31C are fed back to be used for readout at the correction coefficient memories 15Y, 15M, and 15C. This is because in such a case, a closed loop is made and an oscillation phenomenon can potentially occur, which depends on setting values of memories.

Furthermore, in such an image forming apparatus, driving clocks may differ between the image processing section 21 and the respective output sections 30Y, 30M, 30C, and 30K. Especially in this embodiment, modulated image clocks of respective colors (Y, M, C, and K) change part by part for correction. Therefore, the arbitrator memories 22Y, 22M, 22C, and 22K are provided between the image processing section 21 and the output sections 30Y, 30M, 30C, and 30K so that data can be written in synchronous with the clock for image processing section 21 and read out in synchronous with modulated image clocks of respective colors (Y, M, C, and K). Accordingly, even if modulated image clocks of respective colors (Y, M, C, and K) vary, operation at the image processing section 21 is not affected. Furthermore, even if operation speeds significantly differ between the image processing section 21 and the output sections 30Y, 30M, 30C, and 30K, such difference is arbitrated by the arbitrator memories 22Y, 22M, 22C, and 22K. Furthermore, since a clock generated at the image clock generating section 23 is the only basic clock for the above operation, the entire operation speed can be adjusted by just adjusting the image clock generating section 23.

Figure 7:
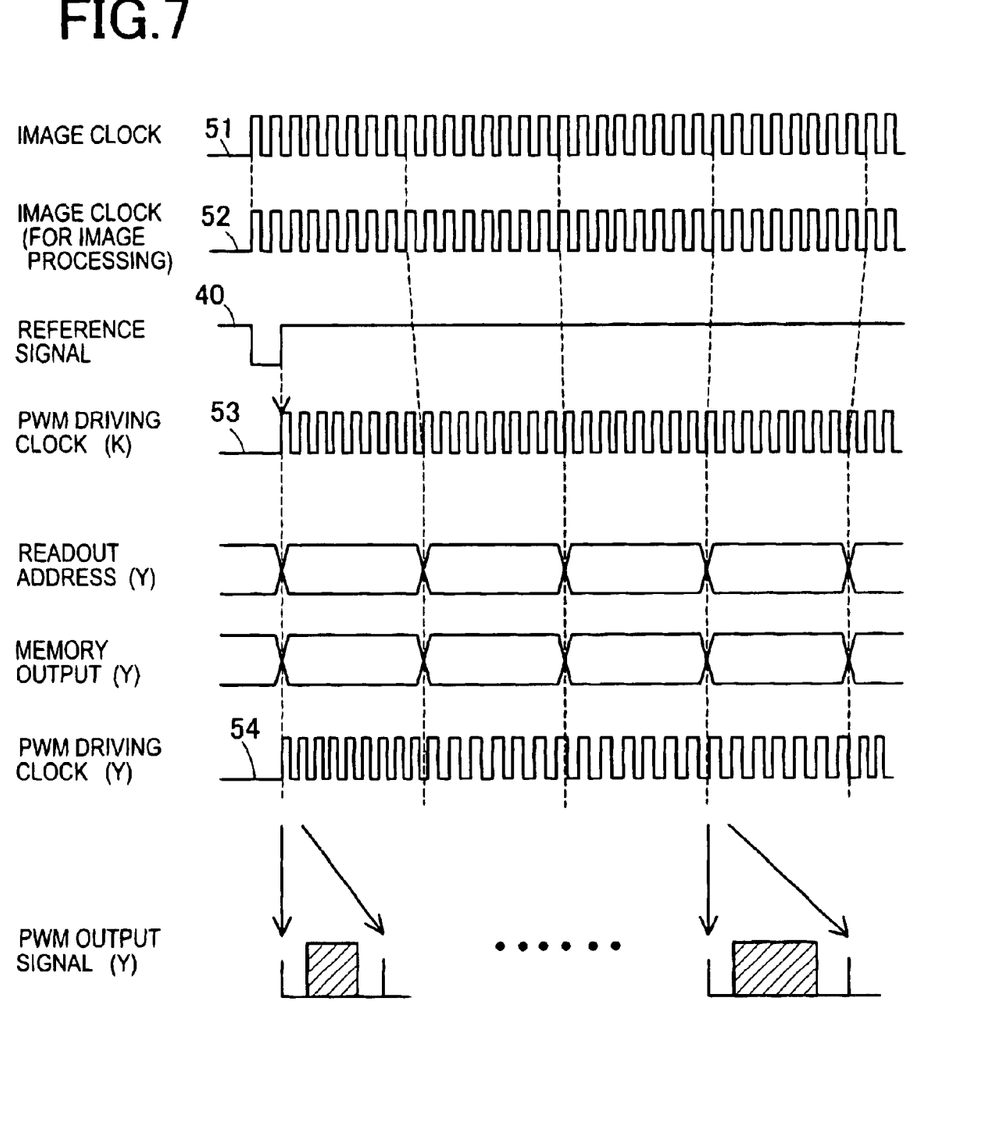
FIG. 7 is a diagram for illustrating a method of partial magnification correction in the main scanning direction.

Next, there will be described how image clocks change at each circuit portion by referring to FIG. 7. Firstly, a basic image clock 51 is generated at the image clock generating section 23. This image clock 51 has constant cycle. The frequency modulator circuit 24 for image processing section 24 generates an image clock 52 from the image clock 51 (see FIG. 5). This image clock 52 has constant cycle, as well. FIG. 7 shows that frequency of the image clock 52 is the same as that of the image clock 51, however, frequency of those clocks may differ. On the other hand, a basic image clock 51 is inputted to the output sections 30Y, 30M, 30C, and 30K.

In the output section 30K, an image clock 51 is modulated to a predetermined multiple by the frequency modulator circuit 31K, thereby to generate a modulated image clock (K). This modulated image clock (K) is synchronized with a reference clock 40 by the synchronizer circuit 32K, whereby a PWM driving clock (K) 53 is obtained (see FIG. 6). Furthermore, a readout address for the correction coefficient memory 15Y is generated from the modulated image clock (K) by the address generating circuit 36. In FIG. 7, a unit of eight clocks is given to a readout address. A manner of dividing addresses is not restricted to the above manner, however, it is preferable that addresses are divided equally so as to correct the entirety of addresses uniformly.

In the output section 30Y, a corrected coefficient (Y) is read out from the correction coefficient memory 15Y per each generated address. Furthermore, an image clock 51 is modulated by the frequency modulator circuit 31Y with a correction coefficient (Y) and then, synchronized with a reference signal 40 by the synchronizer circuit 32Y. As a result, a PWM driving clock (Y) 54 is obtained. Frequency of the clock is partially varied. As shown in FIG. 7, pulse width corresponding to a pixel of a PWM output signal (Y) outputted by the PWM driving clock (Y) 54 differs depending on parts. In an image formed with this output signal, sizes of pixels vary depending on parts, whereby there is formed a yellow image with partial positional shift against a black image being corrected.

As described, according to the image forming apparatus of this embodiment, preparatory processing is made during a stating-up period or the like and image forming processing is conducted during an image formation period. Under the preparatory processing, the CPU 11 makes pixel interval curves 16 of respective colors basing on detection signals from the registered mark detecting sensor 7. Next, the pixel interval curve comparing section 14 compares the pixel interval curves 16 with a curve of a reference color (K), whereby correction coefficients (Y, M, and C) are calculated and stored in the correction coefficient memories 15Y, 15M, and 15C. Under the image formation period, an address is generated from a modulated image clock of reference color and the correction coefficients (Y, M, and C) are read out from the correction coefficient memories 15Y, 15M, and 15C in accordance with the address. Image clocks are modulated by those correction coefficients and PWM clocks of respective colors are generated. Those PWM driving clocks are inputted to PWM of respective colors together with inputted data of respective colors. Accordingly, frequency at each portion of respective colors is modulated and partial magnification is corrected basing on the reference color.

Furthermore, since the image clock generating section 23 generates a clock from which all of the operation clocks working on respective sections are generated, the present image forming apparatus can flexibly cope with change of operation speed by just changing the clock of the image clock generating section 23. Furthermore, addresses for reading out correction coefficients (Y, M, and C) from the correction coefficient memories 15Y, 15M, and 15C are generated from a modulated image clock (K). Accordingly, regardless of any correction coefficients (Y, M, and C), frequencies for respective colors are modulated to meet with timing of frequency for black. Furthermore, even if main scanning directional magnification correction quantity for black fluctuates due to aged deterioration or the like, lengths of one line for other colors are modified following the change of the correction quantity. Accordingly, it is not necessary to separately adjust clocks to be inputted to the address generating circuit.

The present invention is not limited to the embodiment described above and may of course be improved or modified in various manners within the scope and spirit of the present invention.

For example, in the above embodiment, black is designated as a reference color, however another color can be designated as a reference color. Otherwise, an imaginary color can be designated as a reference color, and all of the real colors can be corrected.

For example, in the above embodiment, a unit of eight pixels is given to one address, however, the number of pixels for a unit is not restricted to eight. Ultimately, one pixel to one address is possible.

Furthermore, according to the present invention, an image clock generated at the image clock generating section is modulated by the modulated clock generating section, and modulation clocks for respective colors are generated. At this point, the image clock is modulated in accordance with main scanning directional magnification stored in the reference magnification memory for reference color, and is modulated in accordance with magnification correction data stored in the correction memory for respective colors other than the reference color. Accordingly, if magnification correction data are stored correspondingly to main scanning directional partial variation, modulated clocks for respective colors other than the reference color are clocks partially corrected and modulated. Furthermore, since a control signal to each image forming section is generated in accordance with such a modulated clock, partial magnification corrections are possible as well as constant and uniform positional shift regardless of sections. Furthermore, since magnification correction data is read out basing on a reference magnification clock, modulated timing of a modulated clock is met with that of a reference color. Accordingly, main scanning directional magnification of respective colors are made to coincide with that of the reference color and partial magnification is corrected by each color, whereby a superimposed image is formed.

Furthermore, the inventive image forming apparatus further can comprise a positional shift detecting unit which detects positional shift quantity in main scanning direction of respective colors with reference to the reference color; and magnification correction data generating unit which generates magnification correction data of respective colors basing on positional shift quantity detected by the positional shift detecting unit, wherein the correction memory stores magnification correction data generated by the magnification correction data generating unit.

Thereby, main scanning directional positional shift quantities of respective colors with reference to the reference color are detected and magnification correction data of respective colors are generated basing on the detected positional shift quantities. Furthermore, since generated magnification correction data are stored in the correction memory, main scanning directional partial magnification correction can be made by using the magnification correction data when forming an image.

Furthermore, in the inventive image forming apparatus, it is preferable that: one of the image forming sections forms an image of a reference color; the image formation controlling section generates a control signal of the reference color basing on a reference magnification clock and image data of the reference color; magnification correction data of respective colors other than the reference color stored in the correction memory are partial magnification correction data for correcting magnification variations which depends on position in a main scanning direction; and modulated clocks of respective colors other than the reference color generated at the modulated clock generating section are partially-modulated clocks clock speed of which vary depending on a position in a main scanning direction.

Thereby, an image of the reference color is formed in accordance with a reference magnification clock and image data of the reference color. On the other hand, images of other colors are formed in accordance with partially-modulated clocks modulated by magnification correction data. That is, since clock speed is changed depending on position within main scanning direction, partial magnification correction depending on position in main scanning direction is possible.

Furthermore, it is preferable that the inventive image forming apparatus further comprises a synchronizer unit which synchronizes generation of control signals of respective colors at the image formation controlling section.

Thereby, main scanning directional start positions of respective colored images formed at the image forming section of respective colors are made to coincide with one another.

Furthermore, in the inventive image forming apparatus, an image clock is modulated basing on magnification correction data and control signals to image forming sections of respective colors are generated. At this stage, image data are read out from the memory in accordance with modulated clocks. Therefore, readout timing is not constant. On the other hand, an input-side clock different from a modulated clock is supplied to the arbitrator memories and the image processing section. Therefore, operation is not affected by clock modulation. Accordingly, an operation clock for the image processing section can be made constant. Furthermore, even if a clock for readout operation is modulated, operation speed can be arbitrated without readout timing surpassing write timing.

As apparent from the above descriptions, according to the present invention, there can be provided an image forming apparatus and image forming method capable of partial magnification corrections on various partial variations of magnification as well as constant and uniform positional shift regardless of any sections.

What is claimed is:

1. An image forming apparatus being tandem type and forming an image by superimposing images formed at image forming sections of respective colors, the image forming apparatus comprising:

a correction memory which stores main scanning directional magnification correction data of respective colors with reference to a reference color;

a reference magnification memory which stores main scanning directional magnification of the reference color;

an image clock generating section which generates an image clock;

a readout unit which reads out main scanning directional magnification correction data of respective colors from the correction memory basing on a reference magnification clock which is equivalent to an image clock modulated basing on main scanning directional magnification of the reference color;

a modulated clock generating section which generates modulation clocks for respective colors by modulating an image clock basing on main scanning directional magnification correction data of respective colors read out by the readout unit; and an image formation controlling section which generates control signals to the image forming sections in accordance with modulated clocks of respective colors generated by the modulated clock generating section and image data of respective colors, wherein respective image forming sections conduct image formation in accordance with control signals of respective colors from the image formation control section.

2. An image forming apparatus according to claim 1 further comprising:

a positional shift detecting unit which detects positional shift quantity in main scanning direction of respective colors with reference to the reference color; and magnification correction data generating unit which generates magnification correction data of respective colors basing on positional shift quantity detected by the positional shift detecting unit, wherein the correction memory stores magnification correction data generated by the magnification correction data generating unit.

3. An image forming apparatus according to claim 1, wherein:

one of the image forming sections forms an image of a reference color;

the image formation controlling section generates a control signal of the reference color basing on a reference magnification clock and image data of the reference color;

magnification correction data of respective colors other than the reference color stored in the correction memory are partial magnification correction data for correcting magnification variations that depends on position in a main scanning direction; and modulated clocks of respective colors other than the reference color generated at the modulated clock generating section are partially-modulated clocks clock speed of which varies depending on a position in a main scanning direction.

4. An image forming apparatus according to claim 3, wherein:

magnification correction data of respective colors other than the reference color stored in the correction memory are to designate magnification at each position in a main scanning direction; and the modulated clock generating section changes clock speed by an increment of predetermined number of reference magnification clocks.

5. An image forming apparatus according to claim 1 further comprising a synchronizer unit which synchronizes generation of control signals of respective colors at the image formation controlling section.

6. An image forming apparatus according to claim 4, wherein regions at the correction memory in main scanning direction are set such that the entirety of main scanning direction is divided uniformly.

7. An image forming apparatus according to claim 1, wherein pulse width corresponding to one pixel with respect to control signals for image formation differ by region in main scanning direction.

8. An image forming apparatus being tandem type and forming an image by superimposing images formed at image forming sections of respective colors, the image forming apparatus comprising:

a correction memory which stores main scanning directional magnification correction data of respective colors with reference to an imaginary color;

a reference magnification memory which stores main scanning directional magnification;

an image clock generating section which generates an image clock;

a readout unit which reads out main scanning directional magnification correction data of respective colors from the correction memory basing on a reference magnification clock which is equivalent to an image clock modulated basing on main scanning directional magnification;

a modulated clock generating section which generates modulation clocks for respective colors by modulating an image clock basing on main scanning directional magnification correction data of respective colors read out by the readout unit; and an image formation controlling section which generates control signals to the image forming sections in accordance with modulated clocks of respective colors generated by the modulated clock generating section and image data of respective colors, wherein respective image forming sections conduct image formation in accordance with control signals of respective colors from the image formation control section.

9. Image forming method for forming an image by superimposing images formed at image forming sections of respective colors, the image forming method comprising steps of:

obtaining main scanning directional magnification of a reference color;

obtaining main scanning directional magnification correction data of respective colors with reference to the reference color;

reading out main scanning directional magnification correction data of respective colors other than the reference color basing on a reference magnification clock which is equivalent to an image clock modulated by main scanning directional magnification of the reference color;

generating modulated clocks of respective colors by modulating an image clock basing on main scanning directional magnification correction data of respective colors read out;

generating control signals of respective colors in accordance with modulated clocks of respective colors and image data of respective colors; and forming images of respective colors in accordance with the control signals of respective colors.

10. Image forming method according to claim 9 further comprising a step of detecting positional shift quantities in main scanning direction of respective colors with reference to the reference color, wherein main scanning directional magnification correction data of respective colors are obtained basing on detected positional shift quantities.

11. Image forming method according to claim 9, wherein, for obtaining main scanning directional magnification correction data, main scanning direction is divided into a plurality of regions for colors other than the reference color and magnification correction data are obtained by each region.

12. Image forming method according to claim 11, wherein generation of modulated clocks for colors other than the reference color is conducted by each region of main scanning direction.

13. Image forming method according to claim 11, wherein entirety of main scanning direction is divided into a plurality of regions uniformly.

14. Image forming method according to claim 9 further comprising a step to generate a plurality of registered marks in main scanning direction, wherein main scanning directional magnification of the reference color and main scanning directional positional shift quantities of respective colors other than the reference color with reference to the reference color are detected by detecting generated registered marks.

15. An image forming apparatus being tandem type and forming an image by superimposing images formed at image forming sections of respective colors, the image forming apparatus comprising:

a memory which stores image data of respective colors for image formation by each main scanning directional line;

an image processing section which conducts image processing in accordance with an input-side clock upon receipt of inputs of image data of respective colors and writing image data after through the image processing in the memory in accordance with an input-side clock;

an input-side clock supplying section which supplies an input-side clock to the image processing section and the memory;

an image clock generator which generates an image clock;

a modulated clock generator which generates modulated clocks of respective colors by modulating image clocks in accordance with main scanning directional magnification correction data of respective colors; and an image formation control section which generates control signals to respective image forming sections by reading out image data of respective colors from the memory in accordance with modulated clocks of respective colors generated at the modulated clock generating sections, wherein respective image forming sections form images of respective colors in accordance with control signals of respective colors from the image formation control section.

* * * * *